3,376,127
AQUATIC HERBICIDAL METHODS
William C. McConnell, Griffin, Ga., and Henry W. Rahn, Pittsburgh, Pa., assignors to Pittsburgh Plate Glass Company, Pittsburgh, Pa., a corporation of Pennsylvania
No Drawing. Continuation-in-part of application Ser. No. 470,265, July 8, 1965. This application May 11, 1966, Ser. No. 549,136
36 Claims. (Cl. 71—66)

ABSTRACT OF THE DISCLOSURE

Water soluble azides are applied to submerged areas to kill aquatic weeds. In a typical application, 2 to 4 pounds per acre potassium azide is applied to a submerged rice field to selectively kill aquatic weeds such as ducksalad.

---

This invention is a continuation-in-part of commonly assigned co-pending U.S. application, Ser. No. 470,265, filed July 8, 1965, now abandoned, which is a continuation-in-part of commonly assigned co-pending U.S. application, Ser No. 400,216, filed Sept. 29, 1964, and U.S. application, Ser. No. 358,121, filed Apr. 7, 1964, now abandoned.

This invention relates to the use of azide-containing compounds as agricultural chemicals. It more specifically relates to the use of these azides to control aquatic weeds. In specific preferred embodiments, the azides are used to selectively kill weeds growing in rice fields.

It has now been found that azide-containing compounds are particularly effective in the control of many of the aquatic plants which commonly infest submerged areas such as ponds, reservoirs, swamps, lakes, irrigation or drainage ditches, and submerged agricultural plots, such as cranberry bogs and rice fields. Although the invention is described with particular reference to the alkali metal azides, notably sodium azide and potassium azide, other water soluble azide-containing compounds can be formulated for use in accordance with this invention.

Certain aquatic weeds, notably grasses, evidence higher resistance to the herbicidal effect of the azides than others. In general, broad-leaf aquatic weeds are particularly susceptible to the herbicidal activity of the azides. Many common aquatic weed pests are consistently killed with relatively low application rates, e.g., about ½ to about 3 pounds per acre-inch of $KN_3$, $NaN_3$, or mixtures thereof. Of course, the amount of azides required to effectively control weed pests is generally dependent on the maturity and species of the plants, the depth and stillness of the water, and the vehicle employed to treat the water. A minimum of about ¼ pound of azide per acre-inch is normally required to control most aquatic weeds although lesser amounts are occasionally effective. Rarely is an application rate in excess of about 5 pounds of azide per acre-inch required. By "acre-inch" is meant a surface acre of water at an average depth of one inch.

Because of the varying depth of water used in submerged agricultural plots, application rates of azide to these plots are conveniently expressed in terms of pounds per acre-inch of water. It has been found, however, that when azides are applied to submerged rice fields the application rate is desirably kept within a level expressed in pounds per-acre which is tolerated by the rice plants. Upon application to a submerged area, the alkali metal azides apparently split between the aqueous phase and the bottom soil. The precise number of pounds of azide per acre which may safely be applied to a submerged rice field depends, among other things, on the species of rice planted and the nature of the bottom soil. As a rule, these rates are below about 10 barely above about 20 pounds per acre. Typical rates are about 2 to about 8 pounds per acre. Because rice is far more tolerant to azides than most aquatic weeds, particularly broad leaf weeds, these application rates are generally effective in killing aquatic weed pests without significant damage to the rice crop.

A herbicidally effective amount of azide is added to the submerged area in any convenient form, e.g., in aqueous or organic liquid media, in solid crystalline form or in combination with a solid carrier or diluent. The preferred method of application is with the azide physically associated with an inert granule. Thus, for example, a submerged plot planted with rice was treated by applying attapulgite clay granules impregnated with 10 percent by weight $KN_3$. The granules were applied at a rate of about 4 pounds $KN_3$ per acre. The rice was 10 inches tall and stood in 3-4 inches of water. The rice field was thoroughly infested with pickerel weed (*Heteranthera limosa*), red stem (*Ammania coccinea*) and water hyssop (*Bacopa rotundifolia*). This single treatment was effective in substantially eliminating all three weeds from the rice plot without noticeable injury to the rice crop. In subsequent applications under similar conditions, it was found that rates of about 2 pounds per acre-inch caused mild damage to the roots of the rice plants. Thus, in the treatment of rice fields to control broad leaf aquatic weeds, applications of up to about 2½, preferably about 1 to about 2 pounds per acre-inch, are preferred.

A particularly useful embodiment of this invention is the effective control of aquatic weeds in irrigation and drainage ditches. Although these ditches can be adequately treated when water is flowing through the ditch, it is preferred to reduce water flow. Ideally, water flow is temporarily stopped until the treatment is completed. Because it is generally desired to clear these ditches of all growth, high application rates are tolerable. Rates on the order of about 3 to about 10 pounds of azide per acre-inch are usually effective in killing substantially all plant life in a ditch. Broad leaf plants are generally eliminated with relatively lower rates, rarely more than about 5, usually about 1 to about 3 pounds per acre-inch. Of course, higher rates are within contemplation.

Water hyacinth which commonly infests rivers and ponds in the southeastern United States may be controlled by applying azides, either as granules or as aqueous solutions directly to the water. In treating infested areas under gently flowing water, it is preferable to apply the azide up stream from the infested area. Also, if water is moving over the infested area, increased dosages are required. Badly infested areas are usually controlled with application rates of about 5 to about 15 pounds of azide per acre-inch.

Periodic treatments may be required to control aquatic weeds in flowing water. In the case of rooted aquatic plants, it is often desirable to employ the azide in a heavy vehicle such as a granule which will carry the azide to the stream bed. These heavy granules resist movement by the currents. In this fashion, the length of time the azide persists in the vicinity of the weed roots is extended.

To attack plants such as dock weed, floating fern, water fern, water hyacinth, or water lettuce, which are characterized by substantial foilage floating on top of the water, the azide is conveniently applied with a carrier lighter than water, e.g., ground corn cobs, wood shavings, or organic emulsions, particularly inverse emulsions wherein the aqueous phase is entrapped in the organic phase. As the carrier floats downstream, it is entrapped in the foliage. In this fashion, a considerable portion of the weed is exposed to a high concentration of azide.

The effectiveness of the azide is often enhanced by employing a surfactant along with the azide. Both ionic and non-ionic surface active agents are employable. The surfactant facilitates dispersion and retention of the azide on the aquatic plants being treated. The surfactant is normally employed in an amount between about 0.1 percent to about 5 percent by weight based upon the active and inert ingredients of the formulation, exclusive of water. Suitable wetting agents include the sodium salts of high molecular weight, alkyl sulfates, alkyl sulfonates or alkylaryl sulfonates, sulfonated dicarboxylic acid esters such as dioctyl sodium sulfonsusinate, alkyl naphthalene and sulfonic acids.

It is within contemplation that other herbicides be applied in combination with the azide to inundated or submerged areas. Fertilizers may also be applied along with the azide in accordance with the teachings of the said copending applications Ser. Nos. 358,121 (now abandoned) and 400,216. Thus, for example, attapulgite clay granules impregnated with about 1 to about 10 percent by weight azide and about 5 to about 20 percent by weight isopropyl N-(3-chlorophenyl) carbamate and about 0.1 to about 5 percent by weight sodium lignosulfonate may be employed in the same fashion as a granule containing azide alone. Most conventional herbicides can be utilized in combination with azide in a similar manner. These admixtures are also useful in solution or emulsion form.

Included among the aquatic plant pests which are conveniently controlled in accordance with this invention are: submersed plants such as bladderwort (Utricularia sp.), bushy pondweed (Najas sp.), coontail (Ceratophyllum sp.), elodea, fanwort (Cabomba sp.), pondweeds (Potamogeton sp.), water milfoil (Myriophyllum sp.), waterweed (Anacharis Elodea sp.), water star grass (Heteranthera sp.), and wild celery (Vallisneria sp.), floating weeds such as duckweed (Lemna), floating fern (Ceratopteris sp.), waterfern (Salvinia sp.), water hyacinth (Eichhornia sp.), water lettuce (Pistia sp.) and water meal (Wolffia), rooted plants with floating leaves such as water lillies (Nuphar sp., Nymphaea sp.) and lotus (Nelumbo sp.), emersed plants such as alligatorweed (Alternanthera), arrowhead (Sagittaria), bulrush (Scirpus sp.), cattails (Typha sp.), lizardtail (Saururus), rush (Juncus sp.), parrotfeather (Myriophyllum), water pennywort (Hydrocotyle sp.), pickerelweed (Pontederia), sawgrass (Cladium), smartweed (Polygonum sp.), spikerush (Eleocharis sp.), water leaf (Hydrolea sp.), water primrose (Jussiaea sp.), cut-grass (Zizaniopsis), black willow (Salix sp.), buttonbush (Cephalanthus sp.) and ditchbank grasses such as southern cutgrass (Leersia), floating-grass (Paspalum), jaragua (Hyparrhenia), knotgrass (Paspalum), maidencane (Panicum), common reeds and watergrass (Hydrochloa). The foregoing list is by way of example only and is not intended to limit the scope of the invention.

Ducksalad (Heteranthera sp.), gooseweed (*Sphenoclea zeylanica*), redstem (*Ammannia coccinea*) and waterhyssop (*Bacopa rotundifolia*) are the prevalent aquatic weeds found in rice fields of the United States. These and similar weeds are prevalent in the major rice growing areas of the world. These weeds typically germinate as soon as rice fields are flooded. They are particularly noxious in water-seeded plots although they are also found in dry-seeded rice plots which are subsequently water-flooded. The use of herbicides to control grass weeds has actually increased the problem of aquatic weeds in dry-seeded rice. Nitrogen is typically applied within two or three weeks after rice emerges. Nitrogen stimulates aquatic weed growth as well as rice growth. When grasses are eliminated from a dry-seeded plot, aquatic weeds grow rapidly, usually competing with rice within two or three weeks after flooding.

Some herbicides, such as 3',4'-dichloropropionanilide (propanil), and S-ethyl hexahydro-1 H-azephine-1-carbothioate (Molinate or Ordram) control grass weeds but are ineffective against most aquatic weeds. Other herbicides such as 2,4-dichlorophenyoxyacetic acid (2,4-D), 2,4,5-trichlorophenyoxyacetic acid (2,4,5-T), 2-(2,4-5-trichlorophenyoxypropionic acid (Silvex) and 2-methyl-4-chlorophenoxyacetic acid (MCPA) which control aquatic weeds injure young rice and cannot be applied during the first several weeks of rice development. Control of aquatic weeds has thus often necessitated draining and drying fields as well as delaying nitrogen application. Even these measures have not always been effective.

According to this invention, it has been found that either sodium azide, potassium azide or a mixture thereof applied to a rice field controls many aquatic weeds, including the aforementioned aquatic weeds most prevalent in rice fields. The azide may be applied to a rice growing area in any convenient fashion, for example, by adding a concentrated aqueous solution to the submerged field or incorporating the azide directly into the flood water before flooding the fields. The preferred method of application is to broadcast an azide-containing formulation across the submerged area. An ideal formulation is an inert granule impregnated with from less than 1 to about 25 percent azide. Preferably, the formulation is applied after the aquatic weeds have become apparent, generally within a week to three weeks after seeding of the rice.

Aquatic weeds of the loosetrife (Lythraceae), pickerelweed (Pontederiaceae) and figwort (Scrophulariaceae) families are highly susceptible to the azides at low rates. Thus, for example, toothcup (Rotala sp.), redstem (Ammannia sp.), (Monochoria sp.), duck salad (Lemna sp.), (Heteranthera sp.), false pimpernel (Lindernia sp.), figwort (*Doparium junceum*) and water hyssop (Bacopa sp.) are controlled with relatively low rates, e.g., about 2 to about 8 pounds per acre, of azide. Relatively immature plants, e.g., duck salad with 1 to 2 leaves have been controlled with rates of application of about 2 to about 4 pounds per acre.

Other aquatic weeds which are controlled by azide at rates below those which cause significant injury to rice include members of the sedge (Cyperaceae), arum (Araceae) and composite (Compostae) families. In addition, many numbers of the bell flower (Campanulaceae), pea (Leguminosae), buckwheat (Polygonaceae), water clover (Marsileaceae) and water wort (Elatinaceae) families are controlled at these rates. In general, higher rates are required to control members of the water plantain (Alismaceae) and grass (Gramineae) families of weeds.

According to one embodiment of this invention, azide is applied in admixture with herbicides effective against grasses but tolerant to rice, e.g., Ordram. According to another embodiment, azide is applied together with a broad leaf herbicide, e.g., the aforedisclosed phenoxy herbicides such as Silvex. In this fashion, a broader spectrum of aquatic weeds is controlled at low rates of application.

The application rates disclosed herein for the alkali metal azides are useful rates for many other azides. Ten pounds of $KN_3$ applied to an acre field flooded to a depth of about 4 inches is equivalent to a rate of about 10 parts per million by weight based on the water. Thus, the azides useful in the practice of this invention need have only relatively low water solubility, e.g., about 0.001 percent by weight. In general, formulation is simplified if the azide possesses greater water solubility, i.e., at least about 0.1 percent by weight. Azides with water solubilities in excess of about 10 percent by weight are conveniently formulated into granules by impregnating inert carriers such as attapulgite or fuller's earth with aqueous solutions of the azide. Less soluble azides are often more conveniently formulated as dry powders in admixture with solid diluents.

The preferred azides of the present invention are those which are persistent at room temperature. That is, they do not decompose spontaneously at room temperature.

Slow decomposition is tolerable. Thus, compounds which decompose over the course of several days, for example, are considered persistent. Persistent azides may nevertheless be highly unstable. Normally explosive azides diluted with sufficient inert diluent, e.g., fuller's earth, gypsum, china clay, diatomaceous earth, talc, sand, oil, acetone, alcohol, etc., to render them non-explosive may be employed.

Specific azides within contemplation include without limitation the alkali metal azides ($NaN_3$, $KN_3$, $LiN_3$, $RbN_3$, and $CsN_3$), the alkali earth metal azides (e.g., $Ca(N_3)_2$, $SrN_3$ and $BaN_3$) hydrogen azide ($HN_3$), ammonium azide ($NH_4N_3$) and quaternary ammonium azides (e.g., $N(C_2H_5)_4N_3$), $N(CH_3)_4N_3$, $(NH_2OH)_2 \cdot HN_3$ and $N_2H_4 \cdot HN_3$). Organic azides are often essentially water insoluble. Many organic quaternary ammonium azides, notably those in which the organic moities are short chain aliphatic groups, are sufficiently water soluble for use in accordance with this invention. Many of the acyl azides of the general formula $R.CO.N_3$, notably those in which R is a short chain aliphatic group, are useful. R may also be a phenyl, phenoxy, methyl or naphthyl residue which may contain nitro, alkyl, halogen, alkoxy, aryloxy or cyano substituents provided the compound is sufficiently soluble for use. Double salts such as $Ni(N_3)_2 \cdot NH_4N_3$ and $Ni(N_3)_2 \cdot KN_3$ are also within contemplation. The persistent non-explosive azides are preferred, particularly those with water solubilities above about 1 percent by weight. Among these, the inorganic azides are usually preferred for economic reasons. The alkali metal azides, hydrogen azide and ammonium azide constitute a preferred class. Of these, sodium and potassium azides are highly preferred because of their activity, availability, persistence and stability.

The description of the inveniton with reference to details of certain specific embodiments is not intended to limit the scope of the invention except insofar as these details appear in the appended claims.

We claim:

1. A method of killing aquatic weeds which comprises applying a herbicidal amount of a water soluble azide selected from the group consisting of the presistent alkali metal azides, alkali earth metal azides, hydrogen azide, ammonium azide, quaternary ammonium azides, double azide salts and acyl azides to the water in which the aquatic weeds are growing.

2. The method of claim 1 in which the azide is applied in the form of azide-containing granules comprising a substantial portion of inert materials.

3. The method of claim 1 wherein the azide is sodium azide.

4. The method of claim 1 wherein the azide comprises an alkali metal azide.

5. The method of claim 1 wherein the azide has a water solubility of at least about 0.001 percent by weight.

6. The method of claim 1 wherein the aquatic weeds are floating weeds.

7. The method of claim 5 wherein the azide comprises sodium azide or potassium azide and the azide is applied at a rate of at least about ¼ pound per acre-inch.

8. The method of clearing weeds from a water submerged area which comprises introducing to the water in said submerged area a herbicidal amount of a water soluble azide selected from the group consisting of the persistent alkali metal azides, alkali earth metal azides, hydrogen azide, ammonium azide, quaternary ammonium azides, double azide salts and acyl azides.

9. The method of claim 28 wherein the azide is selected from the group consisting of sodium azide and potassium azide.

10. The method of claim 9 wherein up to about 15 pounds of azide are introduced to said ditch per acre-inch of water carried thereby.

11. The method of killing aquatic weeds in a submerged area in which rice is growing without unacceptably damaging the rice which comprises applying a herbicidal amount of a water soluble azide selected from the group consisting of the persistent alkali metal azides, alkali earth metal azides, hydrogen azide, ammonium azide, quaternary ammonium azides, double azide salts and acyl azides to the area.

12. The method of claim 32 wherein the azide is selected from the group consisting of sodium azide and potassium azide.

13. The method of claim 12 wherein the aquatic weeds are characterized by having a substantial foliage floating on the water and the azide is applied associated with a carrier lighter than water.

14. The method of claim 12 wherein the submerged area is infested with broad leaf aquatic weeds and up to about 5 pounds of azide per acre-inch is applied to the submerged area.

15. The method of claim 14 wherein up to about 2½ pounds of azide per acre-inch is applied to the submerged area.

16. The method of claim 14 wherein the broad leaf aquatic weeds include water hyssop.

17. The method of claim 14 wherein up to about 20 pounds per acre of azide is applied to the submerged area.

18. The method of claim 17 wherein up to about 10 pounds per acre of azide is applied to the submerged area.

19. The method of claim 18 wherein between about 2 and about 8 pounds per acre of azide is applied to the submerged area.

20. The method of claim 12 wherein the aquatic weeds are broad leaf aquatic weeds.

21. The method of claim 12 wherein the aquatic weeds are members of the loosestrife family.

22. The method of claim 12 wherein the aquatic weeds are members of the pickerel weed family.

23. The method of claim 12 wherein the aquatic weeds are members of the figot family.

24. The method of claim 20 wherein the azide is applied at a rate up to about 10 pounds per acre.

25. The method of claim 20 wherein the azide is applied at a rate between about 2 and about 8 pounds per acre.

26. The method of claim 25 wherein the azide is applied at a rate between about 2 and about 4 pounds per acre.

27. The method of claim 20 wherein the azide applied is potassium azide.

28. The method of claim 8 wherein the submerged area is a water-carrying ditch.

29. The method of claim 1 wherein the water soluble azide is selected from the group consisting of the alkali metal azides, the alkali earth metal azides, hydrogen azide, ammonium azide and the quaternary ammonium azides.

30. The method of claim 29 wherein the azide is selected from the group consisting of the alkali metal azides, hydrogen azide and ammonium azide.

31. The method of claim 11 wherein the water is soluble azide is selected from the group consisting of the alkali metal azides, the alkali earth metal azides, hydrogen azide, ammonium azide and the quaternary ammonium azides.

32. The method of claim 31 wherein the water soluble azide is selected from the group consisting of the alkali metal azides, hydrogen azide and ammonium azide.

33. The method of selectively killing ducksalad from a submerged area in which rice is growing which comprises applying up to about 10 pounds per acre of potassium azide to the area.

34. The method of claim 33 wherein up to about 4 pounds per acre of potassium azide is applied.

35. The method of claim 1 wherein the azide is potassium azide.

36. The method of claim 1 wherein the azide is ammonium azide.

References Cited

UNITED STATES PATENTS 1,819,399  8/1931  Wessenberg _____ 167—14

FOREIGN PATENTS 898,915  6/1962  Great Britain.

OTHER REFERENCES

Danielson: Weeds, vol 13, #2, pp. 96–98 (1965).
Hill et al.: Chem. Weed Control in Tobacco Plant Bed, 1953, pp. 3, 9, 16–18, 20, 24, 33, 35 and 42.
Lundegardh: Chem. Abst., vol. 44, 596(h), 1950.
Lyr: Chem. Abst., vol. 57, col. 3870(i), 1962.
Ray: Chem. Abst., vol 58, col. 1724(d), (1963).
Chem. Abst., vol 54, col. 15335(c) and 18686 (1950).

JAMES O. THOMAS, JR., *Primary Examiner.*

UNITED STATES PATENT OFFICE
CERTIFICATE OF CORRECTION

Patent No. 3,376,127                                  April 2, 1968

William C. McConnell et al.

It is certified that error appears in the above identified patent and that said Letters Patent are hereby corrected as shown below:

Column 6, line 39, "figot" should read -- figwort --.

Signed and sealed this 23rd day of September 1969.

(SEAL)
Attest:

Edward M. Fletcher, Jr.                        WILLIAM E. SCHUYLER, JR.

Attesting Officer                                      Commissioner of Patents